United States Patent [19] [11] 4,010,243
Thomas [45] Mar. 1, 1977

[54] PREPARATION FOR POTASSIUM BICARBONATE FROM POTASSIUM HALIDE

[75] Inventor: Ian M. Thomas, Temperance, Mich.
[73] Assignee: Owens-Illinois, Inc., Toledo, Ohio
[22] Filed: Nov. 28, 1975
[21] Appl. No.: 638,225
[52] U.S. Cl. .............................. 423/424; 423/422
[51] Int. Cl.² .......................................... C01D 7/16
[58] Field of Search .......................... 423/419–429, 423/186, 187, 189, 190

[56] References Cited

UNITED STATES PATENTS

| | | | |
|---|---|---|---|
| 2,752,222 | 6/1956 | Birman | 423/422 |
| 2,768,060 | 10/1956 | Follows | 423/422 |
| 2,782,093 | 2/1957 | Hulot et al. | 423/422 |
| 2,913,310 | 11/1959 | Sandborn et al. | 423/422 |
| 3,122,173 | 11/1963 | Wolstein | 423/422 |
| 3,347,623 | 10/1967 | Schmid | 423/422 |

FOREIGN PATENTS OR APPLICATIONS

| | | | |
|---|---|---|---|
| 1,924,267 | 9/1970 | Germany | 523/422 |
| 532,301 | 1/1941 | United Kingdom | 423/422 |
| 487,087 | 6/1938 | United Kingdom | 423/422 |

*Primary Examiner*—Oscar R. Vertiz
*Assistant Examiner*—Gary P. Straub
*Attorney, Agent, or Firm*—Robert F. Rywalski; Edward J. Holler

[57] ABSTRACT

A process is provided for converting potassium chloride to potassium bicarbonate with desirable conversions which bicarbonate can then be calcined to potassium carbonate. In one embodiment the potassium bicarbonate is formed in a reaction medium which is an admixture of water and a water miscible alcohol with the other reactants employed being carbon dioxide and an alkylamine. In a more preferred embodiment an alcoholic solution of an alkylamine which solution is saturated with carbon dioxide will be prepared and then an aqueous solution of a potassium halide, preferably potassium chloride, will be added to the alcoholic solution so as to form potassium bicarbonate.

17 Claims, No Drawings

PREPARATION FOR POTASSIUM BICARBONATE FROM POTASSIUM HALIDE

The present invention is directed to the art of forming potassium bicarbonate and more specifically is directed to a process for forming potassium bicarbonate from a potassium halide; even yet more particularly the present invention is directed to forming potassium bicarbonate from potassium chloride employing carbon dioxide and an amine and water as reactants.

For many years sodium carbonate, i.e., soda ash, has been commercially manufactured from sodium bicarbonate which sodium bicarbonate is formed from sodium chloride. In this method of forming the bicarbonate sodium chloride has been reacted with carbon dioxide and ammonia in excess water and is generally referred to in the art as the Solvay Process or the Ammonia Soda Process. The latter process is not suitable however for the production of potassium bicarbonate from a potassium halide for example, potassium chloride. Thus, in order to obtain potassium carbonate from potassium chloride the process which is comercially employed is a two-step process involving the electrolysis of potassium chloride to potassium hydroxide followed by treatment of this product with $CO_2$ to give the carbonate. This obviously is an expensive and high energy consuming process and is accordingly undesirable.

*Thorpes Dictionary of Applied Chemistry*, 4th Edition, (1950), page 150 indicates that the ammonia soda process was attempted by working in alcoholic solutions in an attempt to obtain potassium bicarbonate but that such attempts were not successful. Work has also been done using various amines and amine salts in water but these likewise are not entirely satisfactory for producing potassium bicarbonate from potassium chloride and these processes need improvement.

In accordance with the present invention there is provided an improvement in methods of manufacturing potassium bicarbonates which methods of the prior art involve reactively combining a potassium halide, for example potassium chloride, carbon dioxide, and an alkylamine in the presence of water to form the bicarbonate. The improvement of the present invention essentially resides in employing, in addition to the water which is present both as a diluent and a reactant, a water miscible alcohol, i.e. instead of employing water itself the present invention contemplates performing the reactive combination of the ingredients in the presence of an admixture of water and a water miscible alcohol. It will be found that when practicing the present invention conversions of potassium chloride to potassium bicarbonate, for example in terms of product quality and conversion, will be quite desirable when contrasted to performing the same reaction under substantially identical conditions in the absence of the included water miscible alcohol. The amount of the water miscible alcohol employed in combination with the water will be so selected such that the potassium bicarbonate product has lesser solubility in the water-alcohol medium than in water per se. Exemplary of the water miscible alcohols contemplated herein are methanol, ethanol, normal propanol, isopropanol, and tertiary butanol, or mixtures thereof. Since methanol functions as a partial solvent for the product it will generally be found most desirable to employ a $C_2$ alcohol or higher. Exemplary of the alkylamines are those having 1 to 12 carbon atoms therein. Thus these may be mentioned as primary, secondary and tertiary methylamines, primary, secondary and tertiary ethylamines, primary and secondary normal or isopropylamines, tertiary normal propylamine, primary (normal or iso or secondary or tertiary) butylamines, secondary (normal or iso or secondary) butylamines, tertiary (normal or iso) butylamines. In passing it should be mentioned that mixtures of amines and mixtures of alcohols may likewise be employed. Additionally in order to obtain desired conversions at least stoichiometric amounts of the reactants notably potassium halide for example, potassium chloride, alkylamine, carbon dioxide, and water will be employed, i.e., each of the constituents relative to one mole of potassium chloride will be present in an amount of at least about 1 mole. Quite desirable results will be obtained by employing a molar ratio of the amine to the potassium halide of between about 1.5:1 to about 2:1. Additionally, desirably the volume ratio of alcohol to water in the miscible aqueous alcoholic medium will be at least about 0.5:1 and preferably at least about 1:1. Conveniently, ratios of about 0.5:1 or 1:1 to about 4:1 will be employed. Additionally, conveniently the total volume of alcohol and water employed per mole of the potassium halide will be between about 300 to about 1000 ml. Thus as will be seen from the foregoing the ingredients in performing the process consists essentially of an alkylamine, potassium halide, carbon dioxide, water, and a water miscible alcohol. In passing it should be mentioned that while reference is made to amines or alkylamines and carbon dioxide as reactants it will of course be apparent that since it is probable that these two materials first react to form an alkylamine bicarbonate which then reacts further with the other reagents to form the potassium bicarbonate that this terminology likewise contemplates such a reaction.

While the present method will be found to produce quite desirable results using various orders of addition of the ingredients, in a highly preferred embodiment a prescribed order of addition will be followed. Thus, in accordance with this preferred embodiment of the invention an alcoholic solution of an alkylamine will be prepared which is saturated with carbon dioxide, such solution for example being formed by simply bubbling carbon dioxide into an alcoholic solution of the alkylamine, and then an aqueous solution of a potassium halide is added to that solution. The addition of the aqueous solution of potassium chloride to the alcoholic solution of the alkylamine which has been saturated with carbon dioxide will desirably be done at a rate sufficient to substantially preclude the occurrence of localized high concentrations of potassium halide upon contact with the alcoholic solution. This can be accomplished in various ways and is generally dependent on the manner of the addition of the potassium halide solution and on the degree of agitation in the reactor. For example, the rate can be high if the agitation in the reactor is very violent and turbulent. If on the other hand the agitation is mild then the rate of addition will be slower. Dropwise addition, for example, can be done with mild agitation of the reactor. Quite conveniently one manner of adding the aqueous potassium halide solution to the alcoholic solution is to finely atomize the solution, for example with spray nozzles which are disposed above the alcoholic solution whereby the aqueous solution contacts the surface in a highly atomized small particle state. By following this embodiment of the invention it will be found that residual potassium chloride in the final potassium bicarbonate product will be decreased and accordingly conversions will be highly beneficial. Generally it will be desirable to add the KCl solution over a period of at least five minutes.

The process of this invention may be performed in conventional equipment using a propellor type stirrer operating at about 150–600 RPM and may be performed over a wide range of temperatures and pressures and times. The reaction may be performed at atmospheric pressure with increased yields being realized by employing superatmospheric pressure e.g. pressure up to 50 psig. Convenient temperatures for performing the process are for example between about 25° or 30° C. up to 60° or 70° C. or even higher with a range of about 30° C. to about 50° or 60° C. being quite satisfactory. In a convenient mode of practicing the present invention a potassium halide solution, suitably about 250 ml of water per mole of halide down to the water needed for a saturated solution, will be added to the reactor and the appropriate amount of water miscible organic alcohol then added thereto with stirring. The amine is added in any convenient manner. For example, it can be bubbled in or it can be dissolved in the water miscible alcohol and added in that fashion. Subsequently carbon dioxide gas is then added into the reaction flask. When doing this at atmospheric pressure it will, of course, be most convenient to bubble the gas in under the surface of the reactants in the reactor and if superatmospheric pressure (i.e., pressure above atmospheric) is to be utilized as the mode by which the process is practiced the carbon dioxide gas can similarly be bubbled into the reactants below the surface thereof to build up the appropriate pressure in the head space of the reactor which is maintained during the reaction; if desired the carbon dioxide can be directly dispensed into the reactor into its head space and the appropriate maintained for operation at superatmospheric pressure. The reaction is exothermic and usually a reaction time on the order of about 1–3 hours will be quite sufficient to obtain desired results. Generally the completion of the reaction can be monitored by observing that carbon dioxide is no longer being utilized in the reaction as evidenced for example by its no longer being absorbed in the reaction medium. Upon completion of the reaction the reacted mixture is simply cooled and the solid potassium bicarbonate then separated from the liquid medium by filtration. Potassium carbonate is then obtained by calcination of the potassium bicarbonate.

While the foregoing describes the present invention so as to enable those skilled in the art to make and use same and describes the best modes contemplated in practicing the present invention a few examples nonetheless follow for purposes of further exemplification.

EXAMPLE 1

A solution of diethylamine was prepared by dissolving 66 g (0.9 mole) of this reagent in 300 ml of methanol in a 1000 ml flask fitted with a stirrer and gas inlet and outlet tubes. Carbon dioxide gas was bubbled into the solution and the resulting exothermic reaction was moderated by cooling the reaction flask. After the solution was saturated with carbon dioxide, as evidenced by gas evolution in an exit bubbler, a solution of 37.3 g (0.5 mole) of potassium chloride in 100 ml of water was added over a period of approximately ten minutes. During this addition which was at a rate less than about 0.06 moles of KCl per minute per mole of amine the reaction mixture was stirred vigorously and carbon dioxide gas was introduced slowly, but continuously. At the completion of the potassium chloride addition and cooling to about 20° C, the precipitated reaction product was filtered with suction and washed with 100 ml of methanol. The solid product of potassium bicarbonate was dried at 125° C. for 4 hours and calcined at 250° C. for 1 hour. The weight of the calcined solid was 30.6 g. It was analyzed for potassium carbonate, $K_2CO_3$, by titration with 1.0N hydrochloric acid and found to have a purity of 95%. The percent conversion was calculated as the weight of the solid product times the purity divided by the theoretical yield for complete conversion of potassium chloride to potassium carbonate. The conversion was found to be 84.6%.

EXAMPLES 2–9

These examples indicate the effect of certain reaction parameters on yield and product purity when carrying out the reaction of potassium chloride with diethylamine and carbon dioxide in a methanol/water mixture to produce potassium bicarbonate.

The reactions were carried out in a one gallon stainless steel reactor fitted with a stirrer, thermometer and gas inlet and outlet tubes. The vessel was jacketed in order to permit heating a cooling of the reaction mixture. A bottom outlet permitted convenient removal of the reactor contents.

In the examples that follow, potassium chloride was dissolved in water and added to the reactor followed by the appropriate amount of methanol and diethylamine. After heating to about 50° C. carbon dioxide gas was bubbled into the reaction mixture at a rate sufficient to maintain the reactor at approximately 5 psig. The reaction mixture was heated or cooled as necessary in order to keep the temperature as near as possible to 50° C. A reaction time of two hours was selected and was recorded as that time during which carbon dioxide was being introduced into the reaction mixture. Example 9 differed only in that a reaction time of three hours was employed. Stirring was maintained throughout the reaction. At the end of the reaction period the reaction mixture was cooled to about 20° C. and filtered. Filtrate was used to wash any residual solid product from the reactor and this mixture was then filtered by adding it to the original filter cake still on the filter funnel. Two liters of methanol were used to further wash out the reactor. This methanol was then used to form a slurry of the filter cake which was refiltered. Finally the solid product was washed with two 1.0 liter portions of fresh methanol. The washed product was dried at 70° C. for about 1 hour and calcined at 250° C. overnight.

The analysis of the precipitated and calcined product obtained at the end of the experimental runs included a determination of the amount of potassium bicarbonate, $KHCO_3$, present as well as potassium carbonate, $K_2CO_3$. Potassium bicarbonate was sometimes present in small amounts when calcination was not complete. Approximately 0.2 g of reaction product was dissolved in 75 ml of distilled water and titrated with 0.1 N HCl using phenolphthalein (pH range 8.2–10.0). The volume of hydrochloric acid required was noted and used to calculate the percent composition of $K_2CO_3$ in the sample. About four drops of methyl orange indicator (pH range 3.1–4.4) was then added to the titration flask and the titration was continued to the end point of this acid base indicator. The additional amount of hydrochloric acid required is due to the presence of potassium bicarbonate. The amount of potassium carbonate equivalent to this amount of potassium bicarbonate was calculated and this figure added to the value from the first titration to give a total potassium carbonate assay. The weight of the dried and calcined solid from the reactor times the total potassium carbonate assay divided by theoretical weight is taken as the percent conversion of potassium chloride to potassium carbonate product.

Additional reaction parameters as well as the results of the experiments are reported in Table 1.

Table 1

| Example | Moles KCl | Moles $(C_2H_5)_2NH$ | $CH_3OH$ $H_2O$ Volume Ratio | Total Volume $CH_3OH + H_2O$ | Assay, % $K_2CO_3$ | Conversion |
|---|---|---|---|---|---|---|
| 2 | 5 | 7.5 | 2 | 2700 ml | 90.1 % | 81.3 % |
| 3 | 5 | 7.5 | 1 | 1800 | 95.8 | 92.5 |
| 4 | 4 | 6 | 0.5 | 1400 | 97.6 | 72.0 |
| 5 | 4 | 6 | 1 | 1920 | 97.6 | 81.0 |
| 6 | 4 | 6 | 2 | 2880 | 95.0 | 80.6 |
| 7 | 3 | 4.5 | 3 | 2880 | 88.8 | 69.2 |
| 8 | 4.4 | 4 | 1 | 1920 | 72.1 | 53.7 |
| 9+ | 4 | 6 | 1 | 1920 | 98.8 | 77.6 |

+Reaction time 3 hours.

When potassium chloride is used in excess, Example 8, the assay and conversion are poor. Best results are indicated by using at least stoichiometric amounts of amines and a $CH_3OH:H_2O$ volume ratio of 0.5:1 to 3:1.

EXAMPLES 10 and 11

In these two examples the effect of the order of addition of reagents on the production of potassium bicarbonate is illustrated.

The reactor was the same as that described in Examples 2–9. In Example 10 an aqueous potassium chloride solution was prepared by dissolving 298.2 g (4.0 mole) of reagent in 960 ml of distilled water. This solution was introduced into the reactor and 1920 ml of methanol was added to it. Diethylamine, 438.8 g (6.0 mole) was then added and the resulting mixture was heated to about 38° C. Carbon dioxide was bubbled into the reaction mixture at a rate sufficient to keep the reactor pressure at one atmosphere. The temperature rose to 50° C. within 10 minutes and was maintained at this temperature for one hour and fifty minutes to give a total reaction time of 2 hours. The mixture was stirred continuously throughout the reaction period. After cooling to about 20° C. the solid product was removed from the reactor and filtered. The filtrate was used to wash out the reactor and the additional product was combined with the initial material. Two liters of methanol was used to further wash the reactor and the filter cake was slurried with it also before refiltering. Finally the solid product on the filter funnel was washed with two one liter portions of fresh methanol. The solid product was dried for one hour at 100° C. and then calcined at 250° C. overnight. The weight of the calcined product was 215 g. with a purity corresponding to 97.5% $K_2CO_3$, determined as previously described. The conversion of potassium chloride to potassium carbonate was 75.8%.

In Example 11 the reactor and quantities of reagents were the same as in Example 10. Diethylamine was introduced into the reactor followed by methanol. The temperature of this solution rose to about 32° C. and was cooled to about 18° C. before the addition of carbon dioxide which was bubbled into the mixture at a rate sufficient to maintain a pressure of one atmosphere in the reactor. After about one hour the mixture had become saturated with carbon dioxide as evidenced by the increase in the rate of gas evolution in the exit bubbler. Carbon dioxide was continuously bubbled in throughout the reaction. The temperature at this point was about 20° C. The aqueous potassium chloride solution was then added over a period of 20 minutes. At the end of this addition the temperature of the reaction mixture was increased by external heating to about 50° C. in 15 minutes and held at this temperature for 1 hour before cooling to 21° and removing the product. The mixture was stirred continuously throughout the reaction period.

The product was filtered and washed as described above in Example 10. It was dried at 60° C. for 1 hour and calcined at 250° C. overnight. The weight of the solid product was 225.1 g and analyzed as 98.2% $K_2CO_3$. The conversion was therefore 80.0%

The results of these experiments indicate that the addition of aqueous potassium chloride solution as the last reagent in the reaction mixture is desirable.

EXAMPLES 12–14

In these examples the experimental procedures were essentially the same as those in Examples 2–9 except that ethanol was substituted for methanol. The results are reported in Table 2.

Table 2

| Example | Moles KCl | $(C_2H_5)_2NH$ | $C_2H_5OH$ $H_2O$ Volume Ratio | Total Volume of $C_2H_5OH + H_2O$ | Assay, % $K_2CO_3$ | Conversion |
|---|---|---|---|---|---|---|
| 12 | 4 | 6 | 0.5 | 1440 | 98.7 | 86.7 |
| 13 | 4 | 6 | 1.0 | 1920 | 98.1 | 87.9 |
| 14 | 4 | 6 | 1.0 | 1920 | 98.6 | 87.4 |

A higher degree of purity and percent conversion as obtained here as compared to those reactions using methanol. Examples 13 and 14 were run in an identical manner except that the former used denatured ethanol while the latter used distilled ethanol free of the additives present in the denatured alcohol.

EXAMPLE 15

The procedures followed in this example are substantially the same as those described for Examples 2–9 except that the alcohol used was isopropanol. Four moles of potassium chloride and six moles of diethylamine were used with 960 ml of water and 960 ml of isopropanol. The purity of the product, obtained, calculated as carbonate was 98.3% and the conversion was 89.6%.

EXAMPLES 16–19

In this series of examples isopropanol was the alcohol and diethylamine was the amine. Reactions 16 and 17 were carried out by adding carbon dioxide gas to a water-isopropanol solution of potassium chloride and diethylamine. The reactions were at atmospheric pressure with carbon dioxide gas bubbled into the stirred reaction mixture continuously. Over a period of 20–30 minutes the temperature rose to about 50° C. and then decreased. After cooling to about 20° C. the product was filtered. Table 3 summarizes the results.

propanol) to give a solution of known concentration and appropriate aliquots were then added to the reaction flask to give the desired amount of amine. After addition of the amine solution to the reaction flask additional alcohol was added. Carbon dioxide gas was bubbled into the solution while stirring and cooling. After saturation with carbon dioxide and cooling to 20° C. an aqueous solution of potassium chloride was added dropwise to the mixture in the reaction flask. Stirring was continued throughout the reaction and carbon dioxide was introduced slowly. The reaction was carried out at atmospheric pressure. When addition of potassium chloride was complete and the reaction mixture had cooled to 20° C., approximately 15 minutes, the solid product was filtered with suction and washed once with 100 ml of the alcohol used in the reaction, i.e., methanol or isopropanol. After drying at 125° C. for 4 hours the product was calcined at 250° C. for 1 hour. The product was analyzed for potassium carbonate by titration with 1.0 N hydrochloric acid.

The quantities of reagent used, degree of conversion of potassium chloride to potassium carbonate, and purity of the product obtained are reported in Table 4.

TABLE 4

| Example | Moles KCl | Moles of Amine | Ratio of Volume Alcohol: Volume Water | Total Volume of Alcohol and Water | Assay, %$K_2CO_3$ | Conversion |
|---|---|---|---|---|---|---|
| | | | Methanol and Dimethylamine | | | |
| 20 | 1.0 | 1.55 | 2.2:1 | 450 ml | 65% | 58% |
| 21 | 1.0 | 1.75 | 2.0:1 | 450 ml | 77% | 68% |
| | | | Isopropanol and Dimethylamine | | | |
| 22 | 1.0 | 1.50 | 2.0:1 | 450 ml | 99% | 93% |
| | | | Isopropanol and Monomethylamine | | | |
| 23 | 1.0 | 1.60 | 2.0:1 | 450 ml | 91% | 82% |

In Examples 18 and 19 an isopropanol solution of diethylamine was first saturated with carbon dioxide gas and an aqueous solution of potassium chloride subsequently added, in one case all at once and in the other dropwise. The reactor pressure was atmospheric and Table 3 summarizes these two examples.

EXAMPLE 24

In this example diethylamine is used in a pure aqueous solution with potassium chloride and carbon dioxide. There is no alcohol present.

A solution of potassium chloride was prepared by

TABLE 3

| Example | Moles KCl | Moles $(C_2H_5)_2NH$ | i-$C_3H_7OH$ $H_2O$ Volume Ratio | Total Volume of i-$C_3H_7OH$ and $H_2O$ | Assay, % $K_2CO_3$ | Conversion | Comments |
|---|---|---|---|---|---|---|---|
| 16 | .5 | .75 | 3.5 | 450 ml. | 85% | 84% | $CO_2$ added to solution of KCl $(C_2H_5)_2NH$ $H_2O$, i-$C_3H_7OH$ |
| 17 | .5 | 1 | 3.5 | 450 ml. | 82% | 81% | $CO_2$ added to solution of KCl $(C_2H_5)_2NH$ $H_2O$, i-$C_3H_7OH$ |
| 18 | .5 | .75 | 3.5 | 450 ml. | 89% | 87% | KCl ($H_2O$) added at one time to $(C_2H_5)_2NH$, $CO_2$ i-$C_3H_7OH$ |
| 19 | .5 | .9 | 3.0 | 400 ml. | 100%* | 96% | KCl ($H_2O$) added dropwise over ten minutes to $(C_2H_5)_2NH$, $CO_2$, i-$C_3H_7OH$ |

*also showed 0.3% chloride

EXAMPLES 20–23

In Examples 20–22 the amine used is dimethylamine and in Example 23 the amine is monomethylamine. Because these amines are gases at room temperature they were first dissolved in alcohol (methanol or iso-dissolving 74.6 g (1 mole) of this reagent in 250 ml of water. To this solution was then added 146 g (2 mole) of diethylamine to give a 2:1 molar ratio of amine to potassium chloride. Carbon dioxide gas was then bubbled into the solution at a rate sufficient to maintain a pressure of one atmosphere in the reactor. The temperature slowly rose to about 58° C. and then fell to 40° C. indicating the reaction was substantially complete. The total reaction time was about 90 minutes. The reaction mixture was cooled to 8° C. filtered with suction but not washed. After drying and calcination the solid product was analyzed and found to have a potassium carbonate content of 47%. The degree of conversion of potassium chloride to potassium carbonate was 24%.

EXAMPLE 25

This example is a control experiment wherein the reaction of potassium chloride, diethylamine, and carbon dioxide is carried out in water alone. The procedures followed and reagents used were essentially the same as those described in Example 3. The only difference was the use of 1800 ml of water in this reaction instead of 900 ml of water and 900 ml of methanol used in Example 3. At the end of the reaction the solid product was filtered with suction and was washed with methanol, dried, and calcined. The weight of the product was 174.5 g. Analysis by titration as described in Examples 2–9 gave a potassium carbonate content of 98.4% and a conversion of 49.7%. The benefits of the present invention will be readily apparent.

EXAMPLE 26

Example 1 of U.S. Pat. No. 3,189,409 was duplicated except the amounts of all materials were doubled, e.g. 300 grams of triethylamine, 150 grams of KCl and 350 grams of water were used. After the 4 hour period the solid was filtered and washed with about 100 ml of methanol. There was obtained, after calcination, about 118.9 grams of material which assayed 92.2% $K_2CO_3$ and showed a strong chloride test. The conversion was 78.9 percent.

EXAMPLE 27

The procedure of Example 26 was substantially duplicated in which, in addition to the other materials, there was employed about 350 ml of isopropanol (volume ratio of alcohol to water of about 1:1). The temperature rose to about 50° C and after about 30 minutes began to drop off. After an additional period of about 30 minutes the temperature was about 45° C. The reacted system was then cooled over a period of about 1 hour to about 15° C. After filtering, washing and calcination there was obtained about 135.6 grams of material which assayed 100% $K_2CO_3$, and which showed a trace of chloride, for a conversion of nearly 97%.

I claim:

1. A method of manufacturing potassium bicarbonate comprising adding an aqueous solution of a potassium halide to an alcoholic solution of an alkylamine which latter solution is saturated with carbn dioxide so as to form potassium bicarbonate, said alcohol of said solution being water miscible, and separating said bicarbonate and wherein said alkylamine contains from 1 to 12 carbon atoms and wherein at least a stoichiometric amount of said alkylamine is employed relative to said halide and further wherein said aqueous solution of potassium halide is added at a rate sufficient to substantially preclude localized high concentrations of potassium halide upon contact with said alcoholic solution.

2. The method of claim 1 wherein said aqueous solution is added over a period of time which is in excess of about 5 minutes.

3. The method of claim 1 wherein said aqueous solution is added by being atomized over the surface of the alcoholic solution.

4. The method of claim 1 wherein said amine is an amine having 1 to 6 carbon atoms.

5. The method of claim 1 wherein the volume ratio of alcohol in said alcoholic solution to water in said aqueous solution is about at least 0.5:1.

6. The method of claim 1 wherein said alcohol is a $C_1$–$C_3$ alkyl alcohol, or tertiary butanol, or mixtures thereof.

7. The method of claim 1 wherein said alcohol is isopropanol or ethanol.

8. The method of claim 1 wherein said halide is the chloride.

9. A method of manufacturing potassium bicarbonate comprising reactively combining a potassium halide, an alkylamine and carbon dioxide in the presence of a miscible aqueous alcoholic medium, and wherein said alkylamine is employed in at least stoichiometric amounts relative to said halide, so as to form said bicarbonate, said medium being so selected that said bicarbonate is more insoluble therein than in water alone, and separating said bicarbonate and wherein said amine contains from 1 to 12 carbon atoms.

10. The method of claim 9 wherein the volume ratio of alcohol to water in said medium is at least about 0.5:1.

11. The method of claim 10 wherin said ratio is between about 0.5:1 to about 4:1.

12. The method of claim 1 wherein the mole ratio of said amine to said halide is about 1.5:1 to about 2:1 and wherein the total volume of water and alcohol of said medium is between about 300–1000 ml per mole of said halide.

13. The method of claim 9 wherein said reactive combining is done at superatmospheric pressure up to 50 psig.

14. The method of claim 9 wherein said alcohol is a $C_2$ or higher alkyl alcohol or mixtures thereof.

15. The method of claim 9 wherein said alcohol is ethanol.

16. The method of claim 9 wherein said alcohol is normal propanol or isopropanol.

17. The method of claim 9 wherein said alcohol is tertiary butanol.

* * * * *

UNITED STATES PATENT AND TRADEMARK OFFICE
CERTIFICATE OF CORRECTION

PATENT NO. : 4,010,243
DATED : March 1, 1977
INVENTOR(S) : Ian M. Thomas

It is certified that error appears in the above-identified patent and that said Letters Patent are hereby corrected as shown below:

Column 3, line 37 after the word "appropriate" insert -- pressure --.

Column 6, line 65 delete "as" and substitute therefor -- was --.

Column 10, line 42 in Claim 12, line 1, change the dependency from "1" to -- 11 --.

Column 9, line 55 in claim 1, line 4 delete "carbn" and substitute therefor -- carbon --.

Signed and Sealed this

Thirty-first Day of May 1977

[SEAL]

Attest:

RUTH C. MASON
Attesting Officer

C. MARSHALL DANN
Commissioner of Patents and Trademarks